March 8, 1932.　　F. G. KOEHLER　　1,848,956
TRUCK COUPLING
Filed July 8, 1929　　2 Sheets-Sheet 1

INVENTOR
F. G. KOEHLER
BY J. H. Cook
ATTORNEY

March 8, 1932.  F. G. KOEHLER  1,848,956
TRUCK COUPLING
Filed July 8, 1929   2 Sheets-Sheet 2
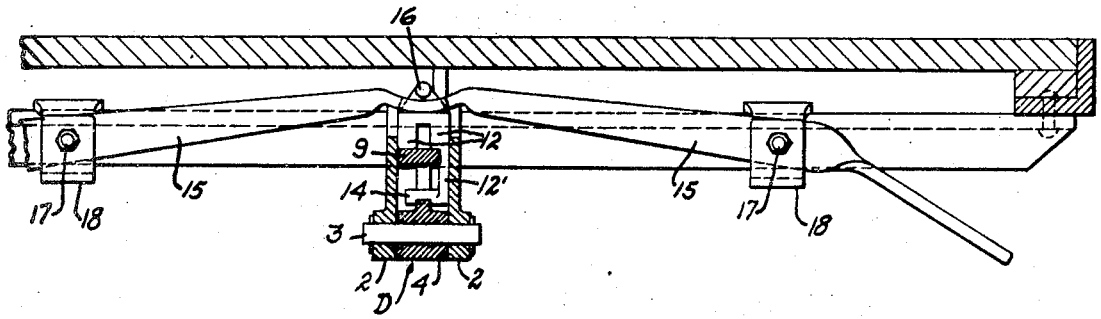
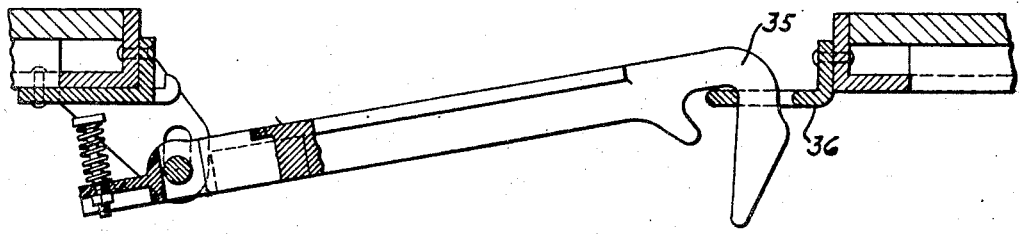
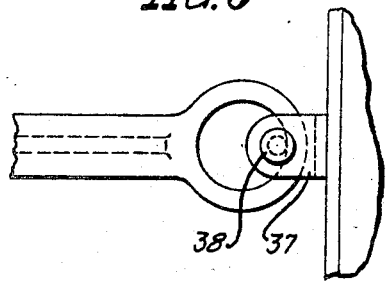
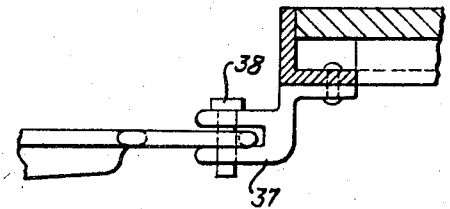
INVENTOR
F. G. KOEHLER
BY *J. H. Cook*
ATTORNEY Patented Mar. 8, 1932

1,848,956

UNITED STATES PATENT OFFICE

FRANK G. KOEHLER, OF ST. LOUIS, MISSOURI

TRUCK COUPLING

Application filed July 8, 1929. Serial No. 376,804.

This invention relates generally to improvements in couplings, and more specifically to improved couplings for use on trucks of the type employed to transport merchandise from place to place in warehouses and other structures, the predominant object of the invention being to provide an improved device of the type mentioned which will function with greater efficiency than similar couplings heretofore known.

Couplings of the type to which the present invention refers include each a connection in the form of a link which is of substantial length. Heretofore this link, when same was not being employed to connect a pair of trucks together, was extended outwardly in an approximately horizontal direction from the truck to which it was attached, and as a result of this situation said link unnecessarily occupied space which could be used to better advantage, and said link also constituted an obstacle by which persons may be injured. An important feature of the present inventon resides in the production of a coupling of the type referred to, which includes a connecting link so arranged that the same may be moved to and maintained in an elevated position when not in use.

Other important features of the invention are found in the shape of the connecting link referred to, which shape permits of a pair of trucks being coupled when they are positioned at a substantial angle with respect to each other, and in the use of a coil spring instead of a flat leaf spring as heretofore for maintaining the link in its proper horizontal operative position.

Still another feature of the invention resides in arranging the coupling head by which the connecting link is engaged approximately flush with the adjacent face of the truck. Heretofore these coupling heads extended outwardly beyond the truck body and hence frequently caused injury to persons and damage to property. By arranging the coupling heads and the levers associated therewith beneath the truck bodies the likelihood of injury or damage being done thereby is greatly reduced.

Fig. 4 is a section on line 4—4 of Fig. 3.

Fig. 5 is a view similar to Fig. 2, but illustrating a modified form of the invention.

Fig. 6 is a fragmentary plan view of another form of the invention.

Fig. 7 is a side elevation of the form of the invention illustrated in Fig. 6, a fragment of the associated truck being shown in section.

Figure 1:
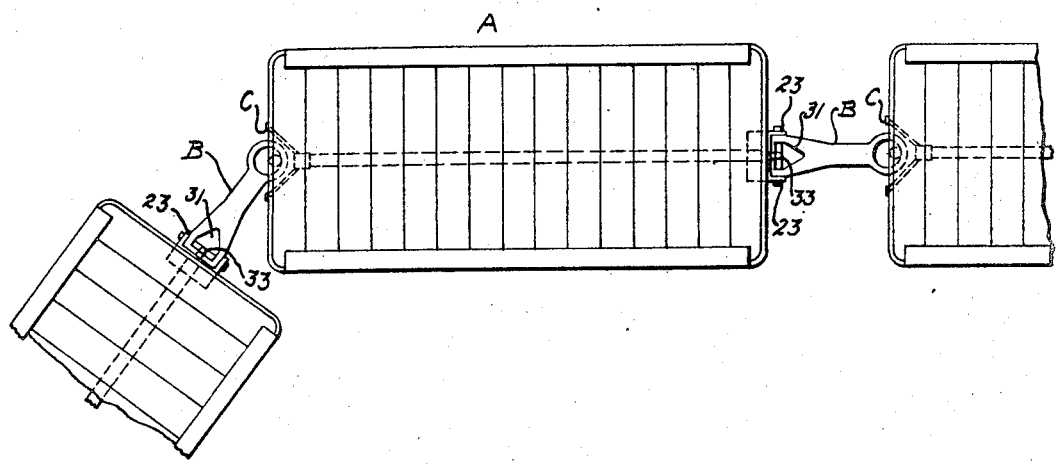
Fig. 1 is a fragmentary plan view of a train of trucks equipped with couplers constructed in accordance with this invention.

In the drawings, wherein is shown for the purpose of illustration one embodiment merely of the invention, and referring particularly to Fig. 1, A designates a plurality of trucks, each of which is provided with a connecting link B at one end thereof and a coupling head C at its opposite end. Each coupling head C is preferably secured to the end of the associated truck by means of bolts 1, and a knuckle D arranged between wings 2 which extend downwardly from the coupling head is pivotally supported by a horizontal pivot pin 3 passing through a hub portion 4 formed on the knuckle, and also through aperture formed in the wings 2. The coupling head has a flaring mouth 5 for the reception of the outer end of the connecting link B.

The knuckle comprises a substantially L-shaped coupling hook 6 extending forwardly and upwardly relative to the horizontal axis of the pivot pin 3, a striking member 7 (Figs. 2 and 3) having a striking face 7', an arcuate friction face 8 adapted to be engaged by a latch device L, and a pair of abutments 9 adapted to cooperate with said latch device. The top wall of the flaring mouth 5 is slotted at 10 to receive the upper portion of the striking member 7, and the bottom wall is slotted at 11 to receive the coupling hook G.

Figure 2:
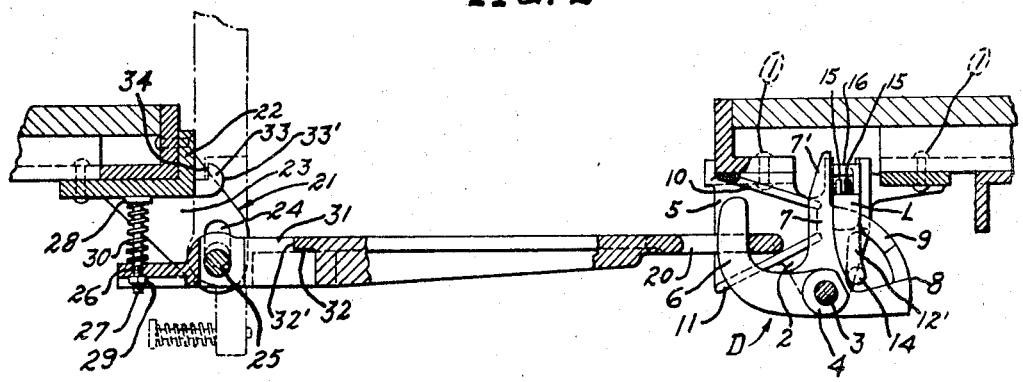
Fig. 2 is an enlarged section on line 2—2 of Fig. 1.
Figure 3:
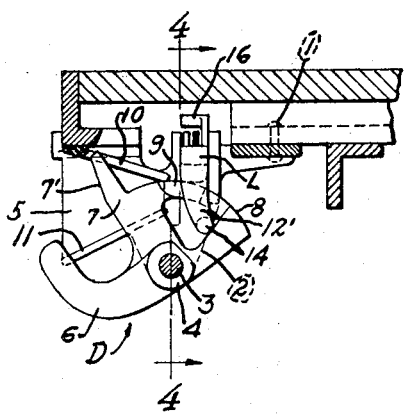
Fig. 3 is a vertical section of the coupling head illustrated in Fig. 2, but showing the knuckle in an open position.

When the knuckle occupies its open position, as shown in Fig. 3, the striking member 7 extends entirely across the flaring mouth 5 of the coupling head, so that its striking face 7' may be engaged by the end of a link B to throw the knuckle to the closed position shown in Fig. 2. When the knuckle is closed its coupling hook extends across the flaring mouth 5 and interlocks with the link B (Fig. 2).

The gravity latch device comprises a vertically movable latch member slidably fitted to the coupling head C and provided with a pair of legs 12 (Fig. 4) which lie directly in front of the abutments 9 when the knuckle occupies its closed position. When the knuckle is open the lower ends of these legs rest upon the arcuate friction face 8, as shown in Fig. 3. When the knuckle is thrown to its closed position, the latch device drops by gravity from the position shown in Fig. 3 to the position shown in Fig. 2, where it will cooperate with the abutments 9 to lock the knuckle. The legs 12 of the latch device then straddle a portion of the knuckle, as shown most clearly in Fig. 4. The bottom portions of the legs 12 are preferably wedge-shaped to allow the gravity latch to drop freely in front of the abutments 9 when the knuckle is thrown to its closed position.

One of the legs is provided with an extension 12' having a transverse retaining arm 14 which extends through an opening in the knuckle to secure the latch device to the knuckle. Unlocking levers 15 extend outwardly from the coupling head C in opposite directions, said levers being extended transversely of the truck and the inner ends of said levers are positioned beneath a pin 16 formed on the gravity latch L at the upper end thereof. The unlocking levers 15 are pivoted at 17 to brackets 18 carried by the truck (Fig. 4), and the outer operating ends of said levers are accessible at the sides of the truck so that the gravity latch L may be elevated by depressing said outer operating end of either of said levers. When the gravity latch is elevated by operation of either of the unlocking levers 15, the knuckle will drop by gravity to the position shown in Fig. 3, thus releasing the coupling hook 6 from the cooperating end of the link B. The coupling hook 6 is of such weight that it overbalances the weight of the other elements of the knuckle and causes the knuckle to move about its horizontal axis to the open position shown in Fig. 3 when the gravity latch is elevated, the movement of the knuckle being limited by the transverse retaining arm 14 of the latch device, as seen in Fig. 3.

As shown in Figs. 1, 2 and 3, the coupling head is substantially flush with the end face of the truck at which it is located, hence said coupling head will not act as an obstruction as would be the case were it extended beyond the end face of the truck, as was the case heretofore. The same is true of the unlocking levers 15 which are located beneath the deck of the truck.

The connecting link B is preferably in the form of a bar having an eye 20 at the end thereof which is engaged by the coupling hook 6 of the knuckle, said eye being circular and of such diameter that it will extend into the flaring mouth 5 of the coupling head a sufficient distance to be engaged by said coupling hook 6. Secured to each truck A at the end thereof opposite to the end at which the coupling head C is located, is a bracket 21, said bracket comprising a substantially L-shaped portion 22 adapted to engage angularly disposed faces of the truck body, and a pair of spaced apart, downwardly extended legs 23. At the lower ends of the legs 23 said legs are provided with horizontally alined openings 24, said openings being elongated in a vertical direction, as shown clearly in Fig. 2. Positioned between the spaced legs 23 is the inner end portion of one of the connecting links B, said connecting link being pivotally attached to said spaced legs by means of a pivot pin 25 which extends through said connecting link and through the elongated openings 24 already referred to.

Adjacent to the end of the connecting link B opposite to the end thereof at which the eye 20 is located, I provide an aperture 26 through which a pin 27 is extended (Fig. 2). This pin is provided at one of its ends with a head portion 28, and at its opposite end said pin is screw-threaded to receive a nut 29. Surrounding the pin 27 and interposed between the head portion 28 thereof and the connecting link B is a coil spring 30 of the compression type, said coil spring tending to force the head portion of the pin in a direction away from the connecting link B and thus cause the nut 29 to engage the face of the connecting link opposite to the face thereof with which the coil spring contacts. In view of the arrangement described and clearly shown in Fig. 2, it is obvious that the nut 29 will limit the expanding action of the coil spring 30, but aside from the limiting action of the nut 29 it is equally plain that the pin 27 may move freely longitudinally through the aperture 26, in response to pressure applied thereto on expansion of the coil spring 30. When the connecting link B is in its normal horizontal position, as shown in Fig. 2, the head portion 28 of the pin 27 contacts with the L-shaped portion 22 of the bracket 21 to maintain the connecting link in such position. The connecting link B is provided with a cut-out portion 31 (Figs. 1 and 2) at an end of which a lug 32 is located, and 33 designates a hook-shaped element which extends outwardly from the bracket 21.

When the connecting link B of one truck A is in cooperative engagement with the coupling hook 6 of the coupling head of another truck, said link will be positioned as shown in Fig. 2, and because of the pivotal connection between the truck and the link, and due to the presence of the coil spring 30, the outer end portion of said connecting link may be freely elevated and depressed, as when the leading truck ascends or descends inclines, the coil spring 30 being compressed between the rear end of the link and the L-shaped portion of the bracket 21 when the forward end portion of the link is depressed, and being moved downwardly away from said L-shaped portion of the bracket 21 when the forward end portion of the link is elevated. Also, when the connecting link B is not being used to connect a pair of trucks together, said connecting link may be elevated to the position in which same is shown by dotted lines in Fig. 2. To maintain the link B in such elevated position the outer end thereof is moved upwardly in an arc of a circle about the pivot pin 25 until the face 32' of the lug 32 contacts with the curved face 33' of the hook-shaped element 33 extended from the bracket 21. Continued movement of the link B inwardly toward the truck which supports the link will result in the curved face 33' camming the link upwardly, during which camming movement the pivot pin 25 will move longitudinally of the elongated openings 24. When the link B has been moved a sufficient distance the lug 32 on the link B will drop by gravity behind the shoulder 34 of the hook-shaped element 33, whereby the link will be maintained in its elevated position.

In Fig. 5 I illustrate a modified form of the invention in accordance with which the connecting link B' is provided with a hook-shaped end 35 instead of an eye, as in the preferred construction. The form of the invention illustrated in Fig. 5 is intended particularly for use in manual coupling of trucks, and includes an apertured element 36 adapted to receive the hook-shaped end portion in cooperative engagement to connect a truck to which the apertured element is fixed to a truck to which the connecting link is attached.

In Figs. 6 and 7 I illustrate a form of the invention where a bifurcated coupling element 37 receives the outer end of the connecting link B<sup>a</sup> provided with an eye, as shown in the preferred form of the invention. In the use of this form of the invention the eye 20' of the connecting link B<sup>a</sup> is introduced between the vertically spaced legs of the bifurcated coupling element 37 and a coupling pin 38 is passed through apertures in the legs of said bifurcated coupling element in a manner to connect the connecting link B<sup>a</sup> to the coupling element 37.

By providing the outer end of each of the connecting links B of my improved structure with an eye, I am enabled to successfully couple a pair of trucks together, even though said trucks be positioned at a decided angle with respect to each other as suggested in Fig. 1. This results from the fact that the coupling action may take place anywhere along the curved edge of the eye of the connecting link instead of at a predetermined restricted portion of the cooperating end of the connecting link, as has been the case heretofore.

I claim:

1. A coupling device comprising a connecting link pivotally attached to a wheeled element in a manner to permit vertical movement of said connecting link at its pivotal point and arranged to assume a substantially horizontal operative position, and means on said connecting link adapted for engagement on vertical movement of the pivotal point of said connecting link with means on said wheeled element whereby said connecting link may be maintained in an inoperative position.

2. A coupling device comprising a connecting link pivotally attached to a wheeled element in a manner to permit vertical movement of said connecting link at its pivotal point and arranged to assume a substantially horizontal operative position, and means on said connecting link adapted for engagement on vertical movement of the pivotal point of said connecting link with means on said wheeled element whereby said connecting link may be maintained in an inoperative position, one of such means comprising a hook-shaped element arranged to engage the other means.

3. A coupling device comprising a connecting link pivotally attached to a wheeled element in a manner to permit vertical movement of said connecting link at its pivotal point and arranged to assume a substantially horizontal operative position, a hook-shaped element on said wheeled element, and a lug on said connecting link, said connecting link being movable to a substantially vertical position where the lug thereon cooperatively engages said hook-shaped element on said wheeled element on vertical movement of the pivotal point of said connecting link, whereby said connecting link may be maintained in an inoperative position.

In testimony that I claim the foregoing I hereunto affix my signature.

FRANK G. KOEHLER.